UNITED STATES PATENT OFFICE.

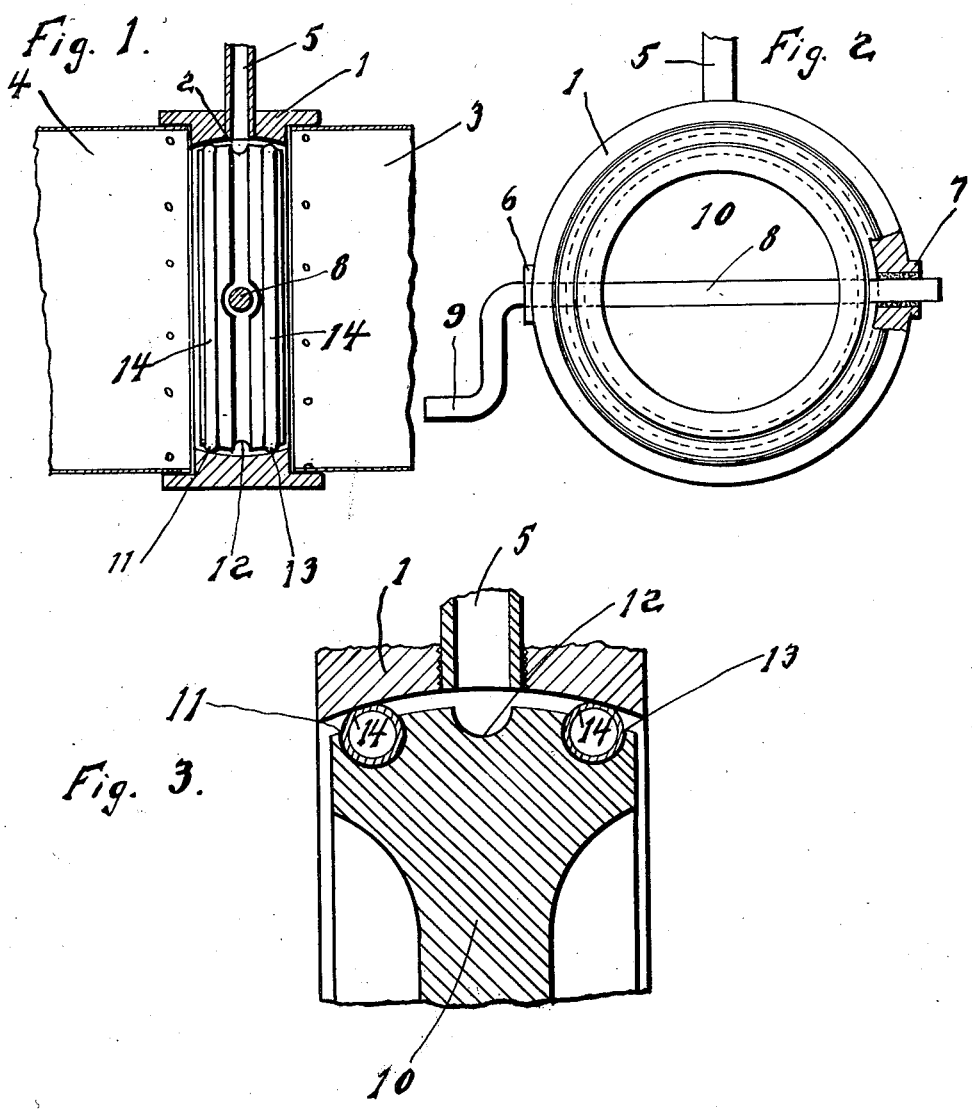

ARTHUR FAGET, OF SAN FRANCISCO, CALIFORNIA.

BUTTERFLY-VALVE FOR AIR-PIPES.

965,999.          Specification of Letters Patent.      Patented Aug. 2, 1910.

Application filed December 6, 1909. Serial No. 531,728.

*To all whom it may concern:*

Be it known that I, ARTHUR FAGET, a citizen of the United States, residing at San Francisco, in the county of San Francisco and State of California, have invented a new and useful Butterfly-Valve for Air-Pipes, of which the following is a specification in such full and clear terms as will enable those skilled in the art to construct and use the same.

This invention relates to a butterfly valve for air pipes, the object of which is to produce a very easy working balanced valve which will produce a tight joint at low pressures, such as are used in ventilating or air-blowing systems.

Another object of the invention is to produce a valve which may have a liquid seal applied thereto when the same is closed, thus avoiding a loss of the air in the pipe.

In the drawing, in which the same numeral of reference is applied to the same portion throughout the several views, Figure 1 is a sectional view of a portion of a pipe containing the valve, showing the valve in side elevation. Fig. 2 is an end view of the pipe in which the valve is placed, the valve being closed, and showing the operating handle therefor; and Fig. 3 is a sectional view of a portion of the valve at the outer edge thereof, illustrating the means for making a tight joint with the edge of the valve in its seat.

The numeral 1 is applied to a casting inside of which is formed the valve seat 2. This casting may have pipes 3 and 4 secured thereto, as may be desired, and at the top thereof there is a pipe 5 which leads to the liquid seal channel in the edge of the valve, as will be explained later. At diametrically opposite points 6 and 7 the casting 1 is enlarged to form bearings for a shaft 8, which passes entirely through the valve, and into each of the bearings in the casting. This shaft is turned by means of a handle 9. The valve is a disk 10, having three grooves 11, 12 and 13 at its outer edge. The grooves 11 and 13 are placed near the edges of the face of the valve, and in each of these grooves there is placed a rubber tube 14, said tube projecting from the edge of the disk sufficiently to form a tight joint with the curved seat of the casting 1. The groove 12 is placed near the center of the edge of the disk 10; this groove extends (like the grooves 11 and 13) entirely around the disk save where the shaft passes therethrough, and at this point sufficient space is provided to permit the passage of the air to all parts of the groove 12.

The operation of the valve is as follows: When it is desired to open the same it is simply turned by means of the handle on the shaft, the rubber tubes passing out of contact with the seat on the casting 1. When it is desired to close the valve it is simply turned into the position shown in Fig. 1, and should the tubes prove to leak a small quantity of air, the liquid seal pipe may be used to fill the grooves 12 with liquid such as water or brine, and the valve will thus remain tight, even though considerably worn.

The advantage of this valve, for low pressures, is that while very large, sometimes two or three feet in diameter, it is balanced, and works very easily, and is very cheaply constructed.

Having thus described my invention, what I claim as new and desire to secure by Letters Patent of the United States, is as follows: .

1. In an air valve, an annulus having a curved seat therein, a disk valve pivoted so that its edges will turn into and out of contact with the valve seat, a flexible air tube at each edge of the disk which tubes are adapted to make a tight joint with the seat of the said casting, and means to supply the space between the tubes with a liquid substantially as set forth.

2. In an air valve, an annulus having a curved seat therein, a disk valve pivoted so that its edges will turn into and out of contact with the valve seat, an air tube at each edge of the disk which tubes are adapted to make a tight joint with the seat of the said casting, and a pipe leading through the annulus to the space between the two tubes to supply a liquid thereto substantially as set forth.

3. In an air valve, an annulus having a curved seat therein, a disk valve pivoted so that its edges will turn into and out of contact with the valve seat, and having a groove therein, and means to supply a fluid to said groove when the valve is closed, making a tight joint with the said casting, as set forth.

In testimony whereof I have hereunto set my hand this 26th day of Nov. A. D. 1909, in the presence of the two subscribed witnesses.

ARTHUR FAGET.

Witnesses:
M. MacInnis,
C. P. Griffin.